United States Patent [19]
Gray

[11] 3,980,137
[45] Sept. 14, 1976

[54] STEAM INJECTOR APPARATUS FOR WELLS

[75] Inventor: William W. Gray, Dallas, Tex.

[73] Assignee: GCOE Corporation, Dallas, Tex.

[22] Filed: June 3, 1975

[21] Appl. No.: 583,281

Related U.S. Application Data

[63] Continuation-in-part of Ser. No. 431,459, Jan. 7, 1974, abandoned, which is a continuation-in-part of Ser. No. 336,784, June 4, 1973, Pat. No. 3,818,173.

[52] U.S. Cl. .................... 166/303; 166/59; 166/75 R; 166/271; 166/272; 166/307
[51] Int. Cl.² .................. E21B 43/00; E21B 43/24; E21B 43/27
[58] Field of Search ............ 166/57, 59, 75, 303, 166/302, 300, 307, 272, 261, 271, 222, 223; 60/39.55, 39.46

[56] References Cited
UNITED STATES PATENTS 2,839,141  6/1958  Walter ................. 166/261

Primary Examiner—Stephen J. Novosad
Assistant Examiner—George A. Suckfield
Attorney, Agent, or Firm—Hubbard, Thurman, Turner & Tucker

[57] ABSTRACT

An apparatus and method for injecting pressurized fluid into a well are disclosed. The apparatus to inject pressurized fluid into a well comprises a combustion chamber, having a coolant jacket positioned to circulate coolant over outer walls of the combustion chamber and into the combustion chamber around the burner such that vapor flows between a flame and inner walls of the combustion chamber. The injected coolant forms a vapor barrier between the flame and the combustion chamber walls and is pressurized for delivery into a well. The combustion chamber can be affixed to the well casing at the surface or the combustion chamber can be used as a "down-hole" vapor generator apparatus.

22 Claims, 4 Drawing Figures

STEAM INJECTOR APPARATUS FOR WELLS

CROSS REFERENCE TO RELATED APPLICATIONS

This is a continuation-in-part of my copending application Ser. No. 431,459 filed Jan. 7, 1974, now abandoned, which is a continuation-in-part of copending application Ser. No. 336,784 filed June 4, 1973, now U.S. Pat. No. 3,818,173.

BACKGROUND OF INVENTION

Heretofore numerous stimulation processes have been employed for increasing production of oil and gas wells by pumping various materials into the well for eliminating deposits of materials such as paraffin, and for dissolving obstructions which impede the flow of petroleum products from earth formations into which the well extends.

Steam has been injected into wells in secondary recovery processes to transfer heat from steam during condensation by conduction to oil bearing sand. An increase in reservoir temperature from 81°F to 200°F results in a 27 fold decrease in crude oil viscosity. This decrease in viscosity permits free flow of formerly "frozen" oil.

Steam injection processes heretofore practiced have enjoyed limited success. However, impurity of injected steam has resulted in formation of a "flue" through which steam passes directly from the injection well to the recovery well, diluting oil recovered and reducing heat transfer to the oil bearing sand.

Heretofore, non-condensable gases, dissolved in boiler feed water, collected in the oil bearing sand forming the "flue" through which steam flowed.

In fracturing processes particulate materials suspended in oil or other fluids are pumped downwardly through a well into the earth formation, fracturing the formation and mechanically holding the formation open to form passages to increase flow of petroleum products therethrough.

Acid treatments are sometimes employed for dissolving flow inhibiting materials out of a formation to enhance the flow of oil and gas into the bottom of a well hole.

Fracturing processes and acidizing processes generally require pumping large quantities of liquid at high pressure into a well to produce satisfactory results. For example, it may be necessary to inject 30,000 gallons or more of hydrochloric acid at pressures ranging from a few hundred pounds per square inch upward to for example, 20,000 pounds per square inch working pressure.

Heretofore, mechanical pumps have been employed for delivering the fluid at the required pressure. Pumping equipment heretofore devised for well stimulation processes has been extremely complicated and expensive.

SUMMARY OF INVENTION

I have devised an improved process wherein a fuel-air mixture is delivered into a combustion chamber disposed inside a water jacket arranged such that cooling water delivered through the jacket is injected into the chamber to flow between the flame and the inner wall of the combustion chamber. The temperature and pressure of fluid passing from the combustion chamber is controlled by adjusting the flow rate of fuel-air mixture into the combustion chamber and the flow rate of coolant delivered thereto.

The fuel-air mixture is preferably a stoichiometric mixture of hydrogen and oxygen such that products of combustion comprise superheated steam. Water circulated through the cooling jacket about the outside of the combustion chamber and injected into the combustion chamber adjacent the burner forms a vapor barrier between the flame and the walls of the combustion chamber. The walls, therefore, will be maintained at a temperature much less than the temperature of the flame of the burning hydrogen which will be about 5,000°F. The walls of the combustion chamber may be maintained for example at 300°F adjacent the flame.

Heated vapor from the combustion chamber is delivered into the well. Suitable additives such as acid, corrosion inhibitors, fracturing sand and the like may be injected into the vapor and transported thereby into the well.

A primary object of the invention is to provide improved steam injector apparatus for wells capable of producing pressures of several thousand pounds per square inch without requiring the use of expensive pumps for pressurizing fluid.

Another object of the invention is to provide improved steam injector apparatus for wells wherein hydrogen and oxygen are burned to form superleated steam which is delivered into a well.

Another object of the invention is to provide steam injector apparatus for wells wherein fluid is heated by injection into a combustion chamber between a flame and walls of the combustion chamber such that walls of the combustion chamber are maintained at a temperature substantially less than that of the flame in the combustion chamber.

Other and further objects of the invention will become apparent upon referring to the detailed description hereinafter following and to the drawings annexed hereto.

DESCRIPTION OF DRAWING

Drawings of a preferred embodiment of my invention are annexed hereto so that my invention may be better and more fully understood, in which.

Figures 1, 2:
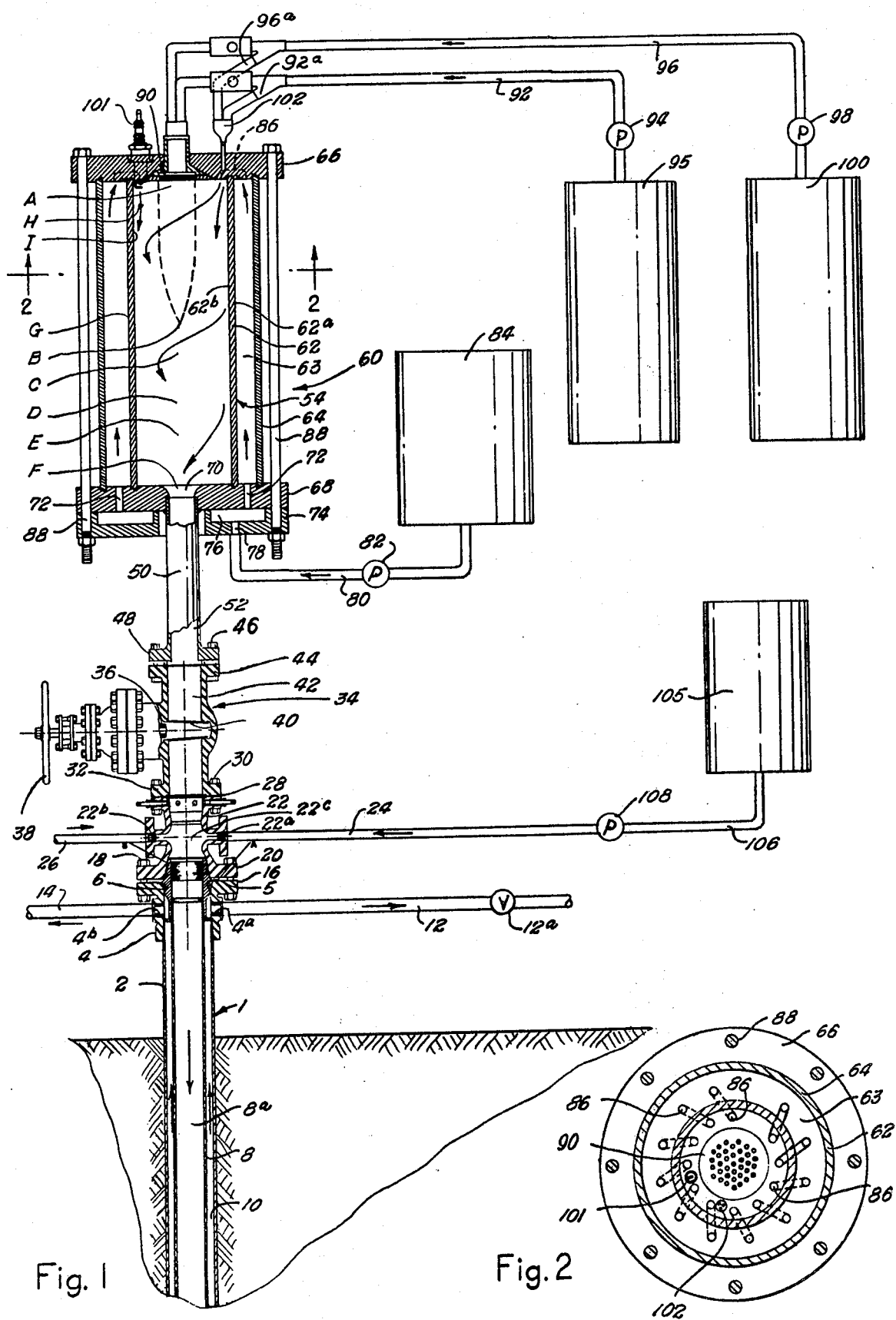
FIG. 1 is a diagrammatic view of a surface mounted vapor generator mounted for injection of steam into a well.
FIG. 2 is a cross-sectional view taken along line 2–2 of FIG. 1.

Numeral references are employed to designate various parts in the drawing.

DESCRIPTION OF A PREFERRED EMBODIMENT

Referring to FIG. 1 of the drawing the numeral 1 generally designates a well having a casing 2 to prevent caving of the walls of the well or ingress of water thereinto. A casing heat 4 is secured to the upper end of casing 2 and has tapered shoulders 5 formed in a central bore extending therethrough for supporting a tubing hanger 6 secured to the upper end of a hollow tubing string 8.

Tubing string 8 extends through the bore of casing 2 forming an annular flow passage 10 therebetween.

Threaded passages 4a and 4b are formed through walls of casing head 4 and receive lines 12 and 14 which may be employed for delivering fluid into or out of the annular passage 10 between casing 2 and tubing 8.

The upper end of casing head 4 has a flange 16 extending thereabout and is secured by bolts 18 to the lower flange 20 of bonnet 22. Seals are provided on tubing hanger 6 such that tightening of bolts 18 prevents flow of fluid between surfaces of casing head 4 and hanger 6.

Bonnet 22 preferably has passages 22a and 22b, into which pipes 24 and 26 are threadedly secured, through which fluid can be injected into the passage 22c through bonnet 22 into the bore 8a inside of tubing string 8.

The upper end of bonnet 22 has a flange 28 extending thereabout secured by bolts 32 to flanged end 32 of a valve 34.

Valve 34 has a gate 36 moveable by a hand wheel 38 from the position illustrated in the drawing to a position in engagement with valve seat 40 such that the passage 42 through valve 34 is closed.

A flange 44 extends about the upper end of the body of the valve 34 and is secured by bolts 46 to a flange 48 on the lower end of a hollow tubular connector 50 having a passage 52 extending therethrough.

A vapor generator generally designated by numeral 60 is secured to the upper end of connector 50 for delivering pressurized fluid downwardly through passages 52, 42, and 22c into passage 8a extending through tubing string 8. Fluid flowing from the lower end of tubing string 8 flows into the annular passage 10 and either circulates upwardly therethrough and is discharged through lines 12 and 14 or flows from annular passage 10 into the earth formation. Lines 12 and 14 preferably have control valves mounted therein to control the flow of fluid from the annulus 10.

Vapor generator 60 comprises an inner tubular member 62 and outer tubular member 64 concentrically mounted and having opposite ends in sealing engagement with end plates 66 and 68 forming an annular flow passage or water jacket 63 about the outer wall of tube 62.

End plate 68 has a central passage 70 extending therethrough into which the upper end of connector 50 is secured such that passage 52 is in fluid communication with the inside of tube 62.

Plate 68 has circumferentially spaced apertures 72 extending therethrough communicating with the annulus 63 between tubes 62 and 64.

A coolant injection manifold is secured to end plate 68 and comprises closure member 74 having an annular groove 76 formed in a face thereof communicating with apertures 72. Closure member 74 has an opening 78 extending therethrough into which a coolant line 80 having pump 82 mounted therein is connected. Coolant line 80 is connected to a source of coolant such as water tank 84.

End plate 66 has spaced grooves or passages 86 formed therein as best illustrated in FIG. 2, such that coolant from tank 84 flows through line 80, groove 76, apertures 72, annular passage 63 and through grooves 86 into the inside of tube 62 adjacent the inner surface 62b of the wall thereof. It should be noted that grooves 86 are arranged to direct vapor along a spiral path adjacent wall 62b toward passage 70.

End plates 66 and 68 and closure member 74 have aligned openings formed therein through which bolts 88 extend for urging the members together into sealing relation with opposite ends of tubes 62 and 64 and for providing seals between surfaces of closure members 74 and end plate 68.

End plate 66 has a central opening having a burner 90 mounted therein. A fuel line 92, having a pump 94 mounted therein, delivers fuel from a suitable source such as container 95 of liquified hydrogen to the burner 90. Line 96, having a pump 98 mounted therein, delivers oxygen, for example, from container 100 of liquid oxygen to the burner 90.

Means is provided for igniting the fuel and oxygen mixture delivered to burner 90. In the particular embodiment of the invention illustrated in the drawing, a spark plug or glow plug 101 is mounted in an opening formed in end plate 66. The plug 101 is connected through a conductor (not shown) to a source of electricity in a manner well-known to persons skilled in the engine art. A pilot burner 102 is mounted on end plate 66 communicating with the inside of tube 62 and is connected through lines 92a and 96a to the fuel and oxygen lines 92 and 96, respectively.

A container 105 of any suitable additive such as hydrogen chloride gas, corrosion inhibitors, or particulate material for use in sand fracturing operations is connected through line 106 and pump 108 with line 24 communicating with the inside of bonnet 22.

OPERATION

The operation and function of the apparatus hereinbefore described is as follows:

A stoichiometric mixture of hydrogen and oxygen is delivered through lines 92 and 96 to the burner 90 disposed inside the combustion chamber 54.

Cooling water is circulated by pump 82 upwardly through the annular passage 63 for cooling the outer wall 62a of tubular member 62 and circulates through grooves 86 into the inside of combustion chamber 54 along a spiral path along the inner walls 62b thereof. It should be readily apparent that the downwardly flowing water or steam, depending on the temperature and pressure, forms a vapor barrier between the flame, adjacent the burner, and walls of the combustion chamber.

Combustion of hydrogen gas produces very little radiant heat. Consequently, heat in the combustion chamber is transferred primarily by conduction from the flame, illustrated in dashed outlines, and from vapor formed during the combustion process.

By way of illustration and in no way limiting, temperatures at various points A - I might be as follows:

| | |
|---|---|
| Point A adjacent burner 90 | 5200°F |
| Point B at the tip of the flame | 2800°F |
| Point C in the chamber 54 | 2300°F |
| Point D in the chamber 54 | 1800°F |
| Point E in the chamber 54 | 1400°F |
| Point F at passage 70 | 1200°F |
| Point G on the outer surface 62a | 300°F |
| Point H at the outlet of groove 86 | 323°F |
| Point I on the inner surface 62b | 325°F |

From the foregoing it should be appreciated that walls of tube 62 are not subjected to intensive heat because vapor flowing from grooves 86 along a spiral path about the flame toward passage 70 forms an insulating "blanket" of cool particles.

Combustion of the hydrogen and oxygen forms high temperature steam which is directed downwardly through passage 70, passage 52, passage 42, passage 22c into passage 8a of tubing 8.

The temperature and pressure of steam delivered is controlled by adjustment of the flow rate of the fuel-air mixture through lines 92 and 96 and adjustment of the flow rate of water delivered into the combustion chamber.

In a typical operation steam flowing through passage 90 might be for example, at 1200°F and 3,000 pounds per square inch pressure.

If it is deemed expedient to do so, suitable additives from container 105 may be injected into the steam through openings 22a and 22b in bonnet 22. Steam, with or without additives, will then flow downwardly through passage 8a into the well.

Depending upon the formation into which the steam is injected, steam will either flow upwardly through annulus 10 and out of line 12 if valve 12a is open or will flow into the formation.

Figure 3:
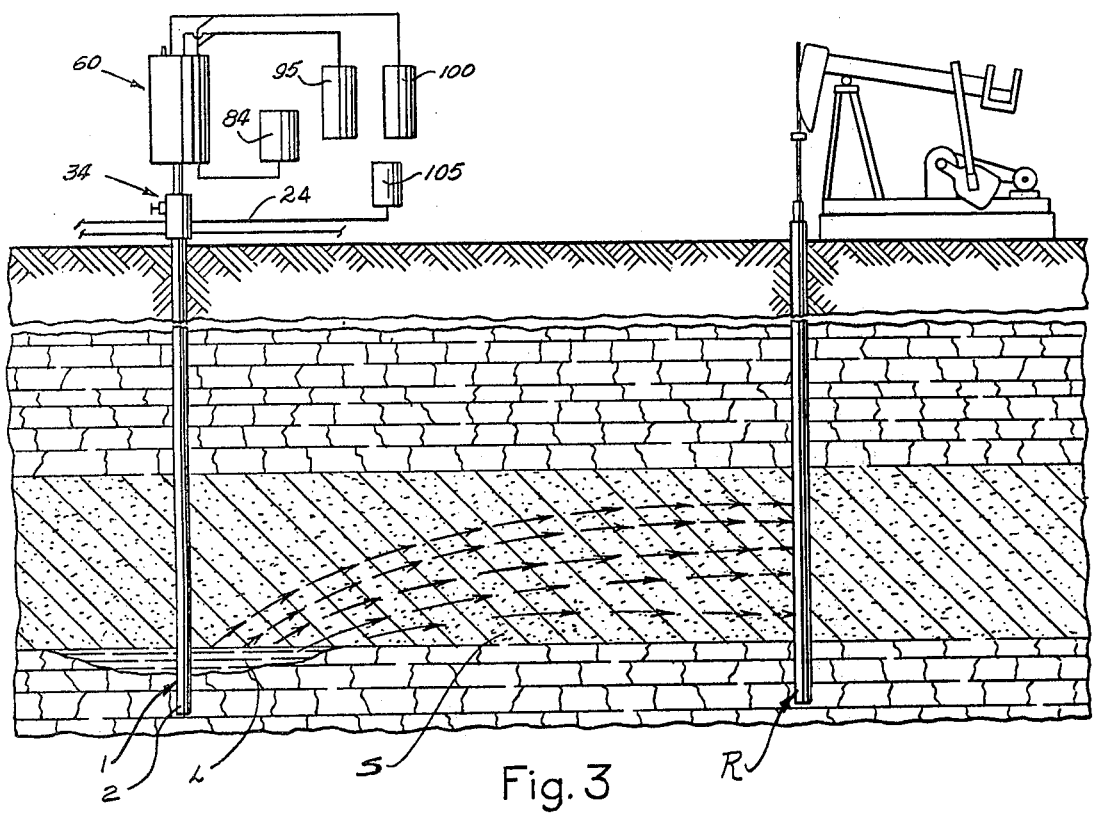
FIG. 3 is a diagrammatic view of earth formations between an injection well and a recovery well.

As illustrated in FIG. 3, steam passing from casing 2 into the oil bearing sand S condenses upon contact with the cooler earth formations and transfers heat thereto. Condensate L travels along numerous random paths to the recovery well R since the non-condensable dissolved gas content of the steam is substantially less than that delivered from boiler type systems heretofore devised to merely heat water which was injected into a well.

From the foregoing it should be readily apparent that the vapor generator hereinbefore described permits employment of large quantities of steam for stimulating production of wells while eliminating expensive equipment heretofore employed for pumping fluid into wells.

The foregoing discussion has been directed to a surface mounted vapor generator for the injection of heated vapor into subterranean strata. In another one of the preferred embodiments of this invention, the vapor generator can be installed in a subterranean locale within a well casing at any desired level. Since one of the prime objects of the injection of heated vapor into subterranean strata to stimulate hydrocarbon recovery and production is the injection of large amounts of heat, this embodiment of the invention provides a simple and efficient method for vapor generation immediately adjacent the subterranean strata containing the hydrocarbon to be produced and recovered.

Figure 4:
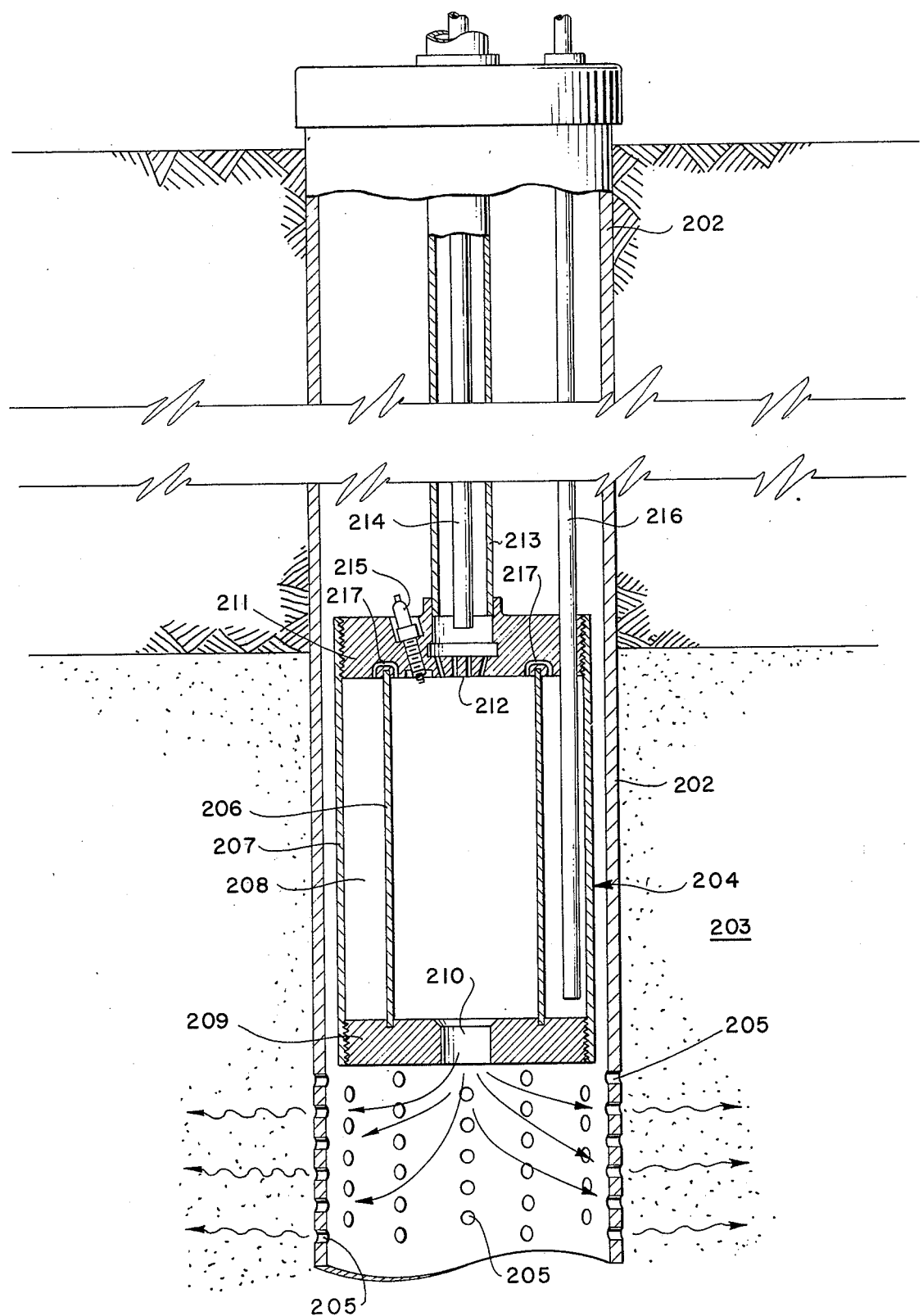
FIG. 4 is a diagrammatic view of a "down-hole" mounted vapor generator for injection of steam into a well.

As shown in FIG. 4, well casing 202 extends downwardly through the well from the surface to the subterranean strata 203 wherein oil or gas is located. Vapor generator 204 is lowered into well casing 202 to any desired level but most preferably to a level immediately above perforations 205 in well casing 202. Such perforations in well casing 202 allow the high pressure, high temperature vapor to be transmitted from the interior of casing 202 into subterranean strata 203. Since it is known that a considerable amount of heat is lost through well casing 202 as steam is injected into a well from the surface and as the steam travels downwardly through the casing, it will be appreciated that the location of the vapor generator adjacent the subterranean strata to be injected results in a material saving of heat energy.

Vapor generator 204 in FIG. 4 of course resembles vapor generator 60 illustrated in FIG. 1. However, because of the size restrictions imposed by the inside diameter of well casing 202, vapor generator 204 will be constructed to fit within casing 202. Thus, vapor generator 204 comprises inner tubular member 206 and outer tubular member 207 thereby forming annular flow passage or coolant jacket 208 in the annular space between the tubular members. First end plate 209 has a centrally located outlet passage 210 whereby there is open communication between the combustion chamber which is formed by the interior walls of inner tubular member 206 and the interior portion of the well casing. Second end plate 211 is located at the top of vapor generator 204. To eliminate the requirement for external bolts to urge first end plate 209 and second end plate 211 together to sealingly engage inner tubular member 206 and outer tubular member 207, the end plates can be threaded into outer tubular member 207 or they may be welded in place. The upper and lower ends of inner tubular member 206 can be seated in suitable annular grooves in end plates 209 and 211.

Second end plate 211 has a central opening having burner 212 mounted therein. Burner 212 can be an arrangement of suitable nozzles or a perforated plate such that the conbustible fuel and oxygen are directed downwardly along the axis of the combustion chamber. Fuel line 213 is connected to a suitable source of combustible fuel such as a natural gas supply (not shown) on the surface. Oxygen line 214 is also connected to a suitable source of oxygen, as for example a compressed air tank (not shown), on the surface. The combustible fuel and oxygen can be mixed at burner 212 or they can be injected into the combustion chamber separately and mixed within the combustion chamber.

Ignition means 215 such as a conventional spark plug, glow plug and the like is disposed near burner 212 for igniting the combustible fuel delivered to burner 212. As shown in FIG. 4, spark plug or glow plug 215 is mounted in an opening formed in second end plate 211. Plug 215 is connected through a conductor (not shown) to a source of electricity on the surface.

Coolant is supplied to vapor generator 204 by means of coolant conduit 216 which is connected to a suitable coolant source (not shown) on the surface such as a water reservoir. Coolant conduit 216 extends through second end plate 211 and extends downwardly into the lower portions of annular flow passage 208 where coolant is discharged through the open end of coolant conduit 216 at a location near outlet passage 210 of the apparatus.

Coolant grooves or passages 217 are positioned such that they form conduits between annular flow passage 208 and the interior of the combustion chamber. Grooves or passages 217 are positioned such that coolant is injected into the combustion chamber along the inner walls of inner conduit 206. The coolant is injected adjacent the inlet of the chamber or adjacent the flame and along the walls and removed from the flame in the central portion of the combustion chamber to prevent the coolant from quenching the flame. The coolant will be injected into the combustion chamber around the upper periphery thereof to provide a uniform barrier between the flame in the combustion chamber and the inner walls of the chamber. Grooves or passages 217 are positioned such that coolant is injected into the combustion chamber in a direction generally parallel to the axis of the combustion chamber. In one of the preferred embodiments, the coolant is injected into the combustion chamber along a spiral path along the inner walls of the combustion chamber so as to swirl downwardly about the inner walls of the combustion chamber. The downwardly flowing coolant, which is water or steam depending on the temperature and pressure within the apparatus, forms a vapor barrier between the flame and the walls of the combustion chamber. Heat from the flame within the central portion of the combustion chamber will be transferred to the coolant to thereby vaporize it forming the desired vapor. The transfer of the heat from the flame to the coolant flowing down the inner walls of the combustion chamber will be by radiant transfer and by conduction from the flame.

From the foregoing it will be appreciated that the walls of inner tubular member 206 are not subjected to intensive heat because of coolant flowing from grooves or passages 217 along the inner surface of inner tubular member 206 of the combustion chamber forms an insulating blanket of vapor.

It will be understood that coolant injected into inner flow passage 208 through coolant conduit 216 can be in the form of liquid or vapor, depending on the temperature and pressures maintained within the combustion chamber and within annular flow passage 208 as well as the residence time of the coolant within annular flow passage 208. Some or all of the coolant may be vaporized within annular flow passage 208 before it is injected into the interior of the combustion chamber through grooves or passages 217. In most operations, however, liquid coolant is injected into the combustion chamber through grooves or passages 217 and the liquid is vaporized within the combustion chamber by means of heat transfer from the flame within the combustion chamber as the coolant flows downwardly along the inner surfaces of inner tubular conduit 206.

The injection of the coolant into annular flow passage 208 at a point adjacent the outlet of the combustion chamber with the passage of the coolant through annular flow passage 208 in a direction countercurrent to the flame with the injection of the coolant into the combustion chamber adjacent the flame and removed from the flame results in virtually no heat loss from the system. Thus, extremely high efficiencies can be achieved by the method and apparatus of this invention.

The temperature and pressure of the vapor generated within the vapor generator is controlled by adjusting the flow rate of the fuel-oxygen mixture through lines 213 and 214 and by adjustment of the flow rate of the coolant delivered into the combustion chamber by means of coolant conduit 216.

In the apparatus illustrated in FIG. 4, it may be desirable to position a suitable packer above vapor generator 204 to prevent high pressure vapor from flowing upwardly within well casing 202. However, it has been found that by sealing the upper portion of well casing 202 around lines 213, 214 and 216, it is not necessary to install packers in the lower portions of the well casing.

In operation, high pressure, high temperature vapor generated within the combustion chamber exits through outlet passage 210 and will flow through perforations 205 as indicated by the arrows in FIG. 4 and into porous subterranean strata 203 containing the hydrocarbon to be produced.

In some "down-hole" installations of the instant vapor generator, it may be desirable to delete the outer cooling jacket around the combustion chamber and to inject the vaporizable coolant, such as water, along the walls of the chamber and removed from the flame without prior heat exchange with the outer walls of the combustion chamber.

While much of the foregoing specification has been directed to the use of hydrogen and oxygen as the combustible fuel mixture for generating high temperature vapors for subsequent injection into subterranean strata, it will be appreciated that the foregoing types of apparatus and method are equally effective for the use of other types of fuels. For example, such fuels as natural gas, butane, propane, town gas, gasoline and the like can be utilized to form the flame or heat source to generate the desired vapor. Additionally, the use of air or other oxygen containing materials to support the combustion within the combustion chamber may be more desirable than the use of pure oxygen. Aside from the obvious economic advantages of using air and combustible fuels other than hydrogen, it has been found that such other fuel mixtures produce large quantities of noncondensable gases such as carbon monoxide, carbon dioxide and the like. Additionally, when air is used in place of pure oxygen, large amounts of nitrogen are present in the vapor flowing from the vapor generator.

In some secondary and tertiary recovery processes for recovering hydrocarbons from subterranean strata, it is desirable to inject large quantities of noncondensable gases into the subterranean strata to repressure the strata as well as to displace liquid hydrocarbons therein. Therefore, in such situations it is highly desirable to utilize fuel-air mixtures wherein large quantities of hot noncondensable gases such as carbon dioxide, nitrogen, nitrogen oxides, carbon monoxide and the like can be forced into the subterranean strata.

While the foregoing disclosure has also been generally directed to the use of water as the coolant fluid, the method and apparatus of this invention is also applicable to the use of other vaporizable materials as the coolant.

It will be understood by those skilled in the art that the foregoing apparatus can be fabricated of any material that is compatible with the operating environment. Since the disclosed apparatus utilizes a coolant injection system wherein the flame within the combustion chamber does not come in contact with the surfaces of the vapor generator, it is not necessary to fabricate the apparatus from exotic heat resistant materials. However, consideration should be given to the use of materials of construction that will withstand the pressures and the corrosive conditions that may be experienced in the locale wherein they are operated.

In should be understood that various changes and modifications may be made in the foregoing apparatus and method without departing from the spirit and scope of this invention.

I claim:

1. A method of injecting steam into a well comprising the steps of: delivering a conbustible fuel and oxygen into a conbustion chamber; igniting fuel in the chamber to form a flame; delivering a fluid into the chamber adjacent said flame and between the flame and along the walls of the chamber and removed from the flame to form a vapor barrier between the flame and along the inner walls of said combustion chamber; and delivering steam from the combustion chamber into a well.

2. The method of claim 1 wherein said fluid is water and said vapor barrier is a steam barrier.

3. The method of claim 2 with the addition of step of injecting water soluble acidic material into the steam.

4. The method of claim 2 with the addition of steps of: injecting hydrogen chloride into the steam to form a hydrochloric acid solution; and injecting of the hydrochloric acid solution into a well.

5. The method of claim 4 wherein the step of injecting hydrochloric acid solution into a well comprises: delivering the hydrochloric acid solution downwardly through the inside of tubing and upwardly through an annular passage between the tubing and casing to engage inner and outer surfaces of the tubing and inner surfaces of the casing with heated hydrochloric acid.

6. The method of claim 5 with the addition of the steps of: controlling the pressure differential in the tubing and the annular flow passage to control pressure to force the hydrochloric acid solution from the annular passage into earth formations.

7. The method of claim 2 with the addition of the step of: injecting particulate material into the steam; and forcing particulate material from the well into earth formation.

8. The method of claim 7 with the addition of the steps of: directing acid into the steam such that particulate material forced into the earth formation forms passages as the acid dissolves portions of the formation.

9. The method of claim 1 wherein said fluid is introduced into said chamber in a swirling manner such that said fluid swirls along the inner walls of said combustion chamber.

10. The method of claim 1 wherein said combustion chamber is positioned in a well casing below the surface of the ground.

11. Apparatus to inject fluid into tubing in a well comprising: a combustion chamber having an inlet end and an outlet end; connector means to secure said outlet end of said combustion chamber to said tubing in said well, said connector means having a passage formed therein communicating with the outlet of said combustion chamber and the inside of said tubing; means to deliver a combustible fuel to said inlet end of said combustion chamber; means to deliver oxygen to said inlet end of said combustion chamber; means to ignite the combustible fuel within said combustion chamber to form a flame; means to inject fluid into said combustion chamber adjacent said inlet end and along the walls of the chamber and removed from the flame such that a vapor barrier is formed between the flame and along the inner side walls of said combustion chamber.

12. The combination called for in claim 11 with the addition of injector means arranged to deliver additives into the well tubing for mixing with pressurized fluid exhausted from said combustion chamber to the tubing.

13. The combination called for in claim 11 with the addition of: means to direct the injected fluid along a spiral path over the inner wall of the combustion chamber.

14. The apparatus of claim 11 with the addition of a cooling jacket surrounding the outer side walls of said combustion chamber, inlet means for passing a cooling fluid into said cooling jacket and means communicating with said cooling jacket and said combustion chamber to transfer said cooling fluid from said cooling jacket into said combustion chamber adjacent the inlet end of said combustion chamber.

15. The apparatus of claim 14 wherein the means for transferring cooling fluid from said cooling jacket into said combustion chamber comprises a manifold in the inlet end of said combustion chamber, said manifold having spaced apertures formed therein arranged to disperse a plurality of jets of fluid into said combustion chamber, said jets being directed generally along the walls of said combustion chamber and at least one conduit communicating with said manifold and said cooling jacket.

16. The apparatus of claim 15 wherein said combustion chamber is a cylindrical chamber and said cooling jacket is the annular space between the outer walls of said combustion chamber and the inner walls of an outer tubular member surrounding said combustion chamber and wherein the inlet means for passing a cooling fluid into said cooling jacket is adjacent the outlet end of said combustion chamber such that said cooling fluid enters said cooling jacket adjacent said outlet end of said combustion chamber and exits said cooling jacket adjacent the inlet end of said combustion chamber.

17. The apparatus of claim 16 wherein said plurality of jets are positioned to direct said fluid along a spiral path over the inner walls of said combustion chamber.

18. The combination of a well casing, said well casing communicating with a subterranean formation; a vapor generator disposed within said well casing at a point below the surface of the ground; means to supply coolant to said vapor generator; means to supply a combustible fuel to said vapor generator; and means to supply oxygen to said vapor generator, wherein said vapor generator comprises (a) a combustion chamber having an inlet end and an outlet end with said inlet end being in communication with said means to supply combustible fuel and said means to supply oxygen and said outlet end being in communication with the inside of said well casing; (b) means to ignite said combustible fuel to form a flame within said chamber; and (c) injection means, communicating with said means to supply coolant, for injecting coolant into said chamber adjacent said inlet end and along the walls of said chamber and removed from said flame such that a vapor barrier is formed between the flame and along the inner side walls of said combustion chamber.

19. The combination of claim 18 wherein said injection means comprises a manifold in the inlet end of said combustion chamber, said manifold having spaced apertures formed therein arranged to disperse a plurality of jets of fluid into said combustion chamber, said jets being directed generally along the walls of said combustion chamber, said manifold being in communication with said means to supply coolant.

20. The combination of claim 19 wherein said plurality of jets are positioned to direct said coolant along a spiral path over the inner walls of said combustion chamber.

21. The combination of claim 19 wherein a cooling jacket surrounds the outer side walls of said combustion chamber with said cooling jacket being in communication with said means to supply coolant such that coolant is introduced into said cooling jacket in heat exchange relationship to the outer walls of said combustion chamber and is thereafter injected into said combustion chamber through said manifold.

22. The combination of claim 21 wherein the inlet of said coolant into said cooling jacket is adjacent the outlet end of said combustion chamber.

* * * * *

UNITED STATES PATENT AND TRADEMARK OFFICE
CERTIFICATE OF CORRECTION

PATENT NO. : 3,980,137
DATED : September 14, 1976
INVENTOR(S) : William W. Gray

It is certified that error appears in the above-identified patent and that said Letters Patent are hereby corrected as shown below:

On the title page, under "Related U.S. Application Data", "Ser. No. 336,784, June 4, 1973, Pat. No. 3,818,173" should be -- Ser. No. 366,784, now abandoned -- .

Column 1, Line 9, "336,784" should be -- 366,784 -- .

Column 1, Line 10, "U.S. Pat. No. 3,818,173" should be -- abandoned -- .

Column 2, Line 27, "superleated" should be -- superheated -- .

Column 8, Line 60, "conbustion" should be -- combustion -- .

Signed and Sealed this second Day of August 1977

[SEAL]

Attest:

RUTH C. MASON
Attesting Officer

C. MARSHALL DANN
Commissioner of Patents and Trademarks